United States Patent [19]
Cavalloni

[11] Patent Number: 5,477,729
[45] Date of Patent: Dec. 26, 1995

[54] ACOUSTIC EMISSION TRANSDUCER

[75] Inventor: Claudio Cavalloni, Winterthur, Switzerland

[73] Assignee: K.K. Holding AG, Winterthur, Switzerland

[21] Appl. No.: 280,533

[22] Filed: Jul. 26, 1994

[30] Foreign Application Priority Data

Sep. 2, 1993 [CH] Switzerland .......................... 02609/93

[51] Int. Cl.$^6$ .......................... G01H 11/08; G01N 29/28
[52] U.S. Cl. .......................... 73/587; 73/644; 73/514.34
[58] Field of Search .......................... 73/587, 517 AV, 73/517 R, 606, 644, 617; 310/329

[56] References Cited

U.S. PATENT DOCUMENTS

| | | | |
|---|---|---|---|
| 3,608,370 | 9/1971 | Vollenweider et al. | 73/517 R |
| 3,921,442 | 11/1975 | Soloway | 73/644 |
| 3,937,068 | 2/1976 | Joy | 73/644 |
| 4,019,373 | 4/1977 | Freeman et al. | 73/644 |
| 4,189,655 | 2/1980 | Bruel | 310/329 |
| 4,314,481 | 2/1982 | Wolfer et al. | 73/774 |
| 5,003,824 | 4/1991 | Fukada et al. | 73/517 R |
| 5,029,474 | 7/1991 | Schulze | 73/587 |
| 5,078,149 | 1/1992 | Katsumata et al. | 73/644 |
| 5,085,079 | 2/1992 | Holdren et al. | 73/517 R |
| 5,168,758 | 12/1992 | Wolfer | 73/774 |

FOREIGN PATENT DOCUMENTS 0336224  10/1989  Germany.

*Primary Examiner*—Hezron E. Williams
*Assistant Examiner*—Rose M. Finley
*Attorney, Agent, or Firm*—Barnes & Thornburg

[57] ABSTRACT

The invention relates to an acoustic emission transducer and a coupling method. The acoustic emission transducer (1) forms an assembly unit and is intended specially for measuring high-frequency acoustic emissions (up to about 2 MHz). It consists of a piezoelectric measuring element (9), an acoustic transmission base (8) with a circumferential coupling diaphragm (7), and an encapsulant (10) which partially encloses the measuring element (9). A mounting screw (3) serves to fix the transducer to a measuring object. The coupling diaphragm (7) lies in a recess (14) of the housing (2), whose bottom surface (5) is at a distance from the measuring object (15) corresponding to the prestressing distance s when the diaphragm (7) is unstressed. The acoustic emission transducer (1) is coupled onto the measuring object (15) by tightening the screw (3) so that the bottom surface (5) is pressed onto the measuring object (15) and fixed to it, tensioning the diaphragm (7) and coupling the mounting base (8) to the surface of the measuring object (15). The invention makes possible miniaturization and more rational production of the transducer as well as improved high-frequency sound transmision.

8 Claims, 1 Drawing Sheet

ACOUSTIC EMISSION TRANSDUCER

The invention relates to an acoustic emission transducer. On automated machine tools, apart from the machining forces a significant role is played in monitoring the machining processes by machine noises or solid-borne sound. Drilling machine monitoring devices which detect drill breakage through the change in the solid-borne sound spectrum exist already. In the domain of finish-machining especially, solid-borne sound measurements yield information additional to that from force and strain measuring.

Solid-borne sound is measured with an accelerometer. A sensor of this kind in described in European patent application 0 336 224 A1 corresponding to U.S. Pat. No. 5,029,474. This sensor serves to test a measuring object, in particular a reactor vessel. It contains a piezoelectric element and a seismic mass, and is tuned to a resonance frequency between 1 kHz and 100 kHz. Placed between the component and the accelerometer is a coupling means, typically a soft metal sheet, which is screwed to the measuring object.

Of interest, however, is not only the analysis of relatively low-frequency sound waves (solid-borne sound, 10 kHz to about 20 kHz), but also that of high frequencies too (acoustic emission up to about 2 MHz). This calls for a still higher resonance frequency and still better coupling of the acoustic emission sensor. In U.S. Pat. No. 4,189,655 an acceleration sensor is described in which a diaphragm is joined to a seismic mass and a piezoelectric acceleration sensor. Coupling onto the measuring surface is effected through a hemisphere, joining the sensor housing elastically to the measuring surface. Unlike the present invention therefore, the sensor is coupled onto the measuring surface without mechanical preload.

Fitting individual sensors involves much trouble, consequently a certain standardization and preassembly are desirable. The purpose of the present invention is to overcome the disadvantages named. The task is performed by making the acoustic emission sensor as an assembly unit comprising a piezoelectric element, an acoustic transmission base with coupling diaphragm, and an encapsulant enclosing the piezoelectric element and in part the acoustic transmission base. The coupling diaphragm is placed in a step in the bottom of the housing, whose surface has a distance s from the measuring object when the coupling diaphragm is unstressed. This is important for coupling the acoustic emission transducer to the measuring object, and will be described in detail in the descriptions of FIGS. 1 and 2.

The invention is described below with reference to two figures.

Figure 1:
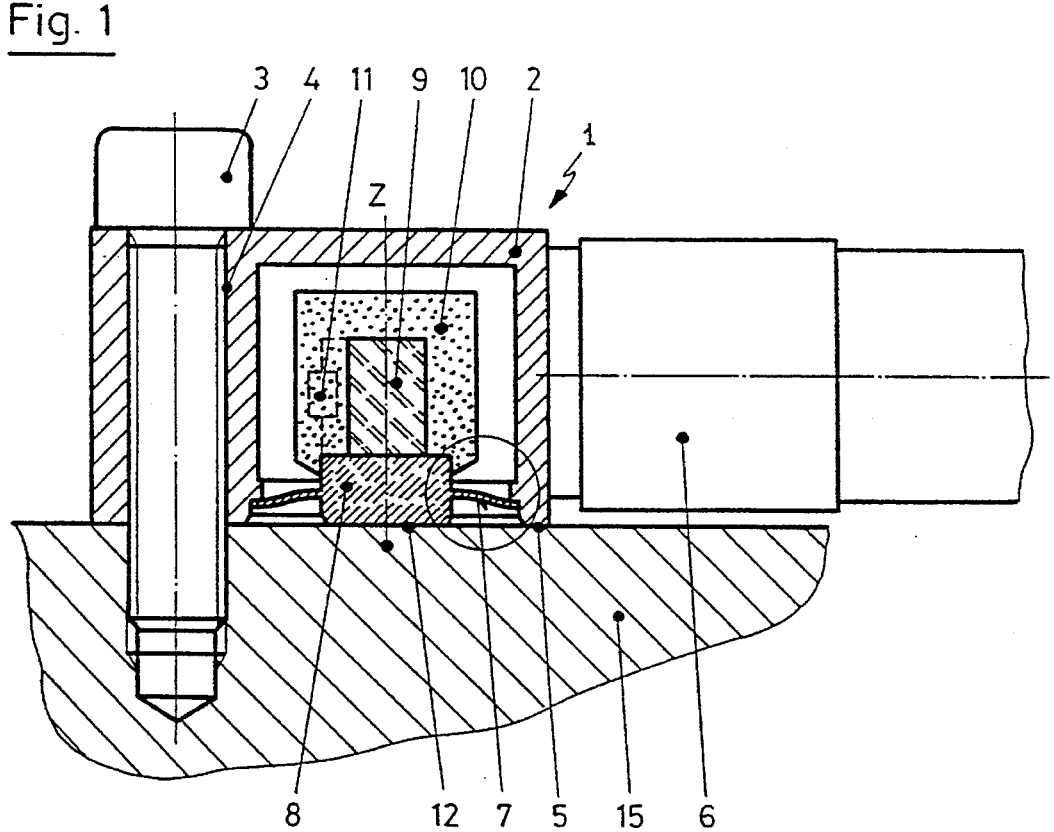
FIG. 1 shows an acoustic emission transducer according to the invention, screwed onto a measuring surface (cross section).

FIG. 1 shows an acoustic emission transducer 1 according to the invention, consisting of the piezoelectric measuring element 9, the acoustic transmission base 8 with coupling diaphragm 7, the encapsulant 10 with the parallel resistor 11, which may also be attached externally or omitted. 2 denotes the housing, 5 the bottom surface, 6 the connector accommodating the signal leads. Inside the housing 2, additional electronic components such as impedance converters may be fitted. The piezo element 9 may be a polarized piezo element of sintered ceramic, its polarization axis lying in the main axis z of the system. It may, however, also be a suitably cut monocrystal of piezoelectric material, such as quartz, or a piezoelectric polymer foil, such as polyvinylidene fluoride (PVDF), glued onto a metal plate for example. The acoustic emission transducer may also contain a seismic mass.

The transducer 1 is fixed on the surface of the measuring object 15 with a mounting screw 3. By tightening this mounting screw 3, which lies in a hole 4 in a side part of the housing 2, the bottom 5 of the housing 2 is pressed against the measuring object 15, the coupling diaphragm 7 is stressed, and consequently the acoustic transmission base 8 too is pressed against the housing. Since the mounting screw 3 is led parallel past the measuring element 9, only the housing 2 is pressed onto the surface of the measuring object 15 depending on the tightening torque of the screw. The pressing force of the coupling diaphragm 7 onto the surface of the measuring object 15, which decisively influences the quality of the acoustic measurement, is obtained with only a slight deflection—(s) of the coupling diaphragm 7 against the housing 2. The coupling is unaffected by the tightening torque of the mounting screw 3, which allows constant and reproducible coupling conditions. Owing to the small coupling surface 12 of the coupling diaphragm 7, relatively small machining tolerances are set for the mounting surface of the measuring object 15.

Fixing the transducer 1 on the surface of the measuring object 15 may also be effected by magnet or gluing instead of the screw 3.

Figure 2:
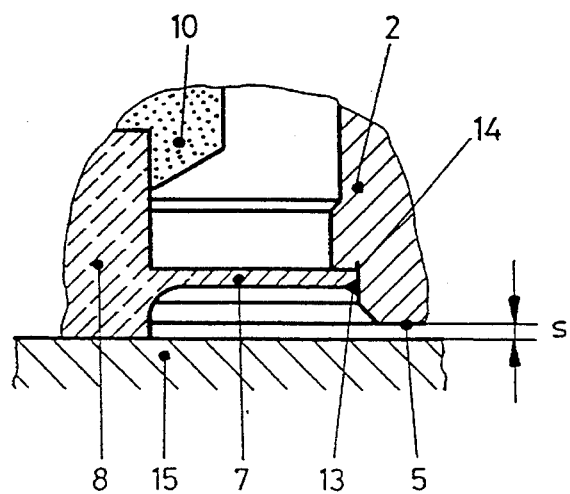
FIG. 2 shows a detailed view of the part ringed in FIG. 1 (before screwing-on, i.e. before stressing the diaphragm).

The coupling mechanism of the acoustic emission transducer 1 is very important for the transmission of high-frequency sound waves, and it is shown in detail in FIG. 2. This detail is circled in FIG. 1. The reference numbers used denote the same as in FIG. 1. The acoustic transmission base 8 bears a circumferential coupling diaphragm 7, which lies in a recess 14 of the housing 2 and is joined, e.g. welded to this. The diaphragm 7 decouples the acoustic emission transducer 1 from the force or strain signals. Before the acoustic emission transducer 1 is coupled to the measuring object 15, the bottom surface 5 of the housing 2 is at a distance s from the surface of the measuring object 15. The coupling procedure involves tightening the mounting screw 3 so that the bottom surface 5 is forced onto the measuring object 15 and fixed to this, and in turn the coupling diaphragm 7 is stressed and the mounting base 8 is coupled onto the surface of the measuring object 15. Any further increase of the pressing force onto the housing 2 does not alter the pressing force of the mounting base 8 onto the measuring object 15. The coupling conditions remain defined and constant, which is essential if the acoustic emission signals are to be assessed for diagnostic purposes. It is also assured that the coupling diaphragm 7 is protected against overload and plastic deformation.

The electrical resistor 11 shown in FIG. 1 (parallel to the piezoelectric measuring element 9) forms an RC element (C: capacitance of the measuring element 9) together with the measuring element 9, i.e. a high-pass filter. The resistor 11 may be potted in the encapsulant 10 as shown in the figure, though it may also be outside the acoustic emission transducer. By varying the resistance 11 the frequency range filtered out and passed to the preamplifier can be adjusted. This may also be effected additionally or exclusively by giving the preamplifier an additional high-pass filter which may be switched in. The parallel resistor 11, may thus be omitted too.

With the invention set out, the acoustic emission transducer is miniaturized and in particular made much more efficient in the high-frequency measuring range by a novel coupling procedure. New application possibilities are opened up by this, especially on machine tools.

What is claimed is:

1. Acoustic emission transducer, comprising:

an assembly unit including a piezoelectric measuring element, an acoustic transmission base with coupling diaphragm and an encapsulant enclosing the piezoelectric measuring element;

a housing including a recess having a bottom surfacing;

the coupling diaphragm lies in said recess and a bottom of the acoustic transmission base extends beyond the bottom surface of the recess at a distance s when the coupling diagram is unstressed; and means for mounting the housing to a measuring object with the bottom of the acoustic transmission base coplanar with the bottom of the recess, so that the coupling diaphragm is preloaded and the acoustic transmission base is pressed with a defined and reproducible force against a surface of the measuring object without thereby preloading said piezoelectric measuring element.

2. Transducer according to claim 1 wherein the piezoelectric element includes an axially polarized piezoelectric ceramic.

3. Transducer according to claim 1 wherein the assembly unit includes a variable electrical resistor forming a high-pass filter with the piezoelectric element.

4. Transducer according to claim 1 wherein said housing includes a hole and said mounting means extends through said hole into said measuring object.

5. Transducer according to claim 1 wherein the encapsulant encloses the piezoelectric measuring element and a portion of said acoustic transmission base so as to form an indispensable group of components.

6. Transducer according to claim 1 wherein the means for mounting also presses the acoustic transmission base with said defined and reproducible force against the surface of the measuring element without thereby preloading of the acoustical transmission base by the housing.

7. Coupling procedure for an acoustic emission having an assembly unit including a piezoelectric measuring element., an acoustic transmission base with coupling diaphragm and an encapsulant enclosing the piezoelectric measuring element; the coupling diaphragm lies in a recess of a housing with a bottom of the acoustic transmission base extends beyond a bottom surface of the recess at a distance s when the coupling diagram is unstressed; the procedure comprising:

placing said acoustic emission transducer on a measuring object with the bottom of said acoustic transmission base engaging said measuring object and the bottom of said recess spaced from said measuring object; and fixing said acoustic emission transducer on the measuring object using a mounting screw so that the bottom surface of the recess is pressed onto the measuring object, the coupling diaphragm is stressed, and the acoustic transmission base is coupled to the surface of the measuring object with an exactly defined and reproducible force without thereby preloading said piezoelectric measuring element.

8. A coupling procedure according to claim 7 wherein fixing the acoustical emission transducer on the measuring element using a mounting screw couples the acoustic transmission base to the surface of the measuring object with an exact defined and reproducible force without preloading the acoustical transmission base by the housing.

* * * * *